United States Patent
Georgescu

(10) Patent No.: US 8,627,387 B2
(45) Date of Patent: Jan. 7, 2014

(54) DISTRIBUTED METHOD OF INDEXING TIME AND FILE SIZE ALIGNMENT

(75) Inventor: Sorin Marian Georgescu, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 55 days.

(21) Appl. No.: 13/335,360

(22) Filed: Dec. 22, 2011

(65) Prior Publication Data

US 2013/0167180 A1   Jun. 27, 2013

(51) Int. Cl.
  *H04N 7/173*  (2011.01)
  *H04N 7/16*  (2011.01)
(52) U.S. Cl.
  USPC ............... 725/88; 725/87; 725/90; 725/93; 725/100; 725/102; 725/109; 725/110; 725/112; 725/116; 725/119; 709/231
(58) Field of Classification Search
  USPC ......... 725/90, 93, 102, 86, 87, 88, 91, 92, 97, 725/100, 109, 110, 112, 116, 119; 709/231
  See application file for complete search history.

(56) References Cited

U.S. PATENT DOCUMENTS

| | | | |
|---|---|---|---|
| 2005/0086696 A1* | 4/2005 | Daniels | 725/88 |
| 2006/0037057 A1 | 2/2006 | Xu | |
| 2010/0211657 A1* | 8/2010 | Kinder et al. | 709/221 |
| 2010/0266052 A1* | 10/2010 | Kim et al. | 375/240.28 |
| 2010/0299701 A1* | 11/2010 | Liu et al. | 725/39 |

FOREIGN PATENT DOCUMENTS

WO   2010/051169 A2   5/2010

OTHER PUBLICATIONS

Huawei Technologies Corp., HTTP Streaming—Text Changes to S4-100085, Mar. 2-4, 2009.*
Fernando, Gerard et al.: "HTTP Streaming Solution—Response to Call for Proposal", Jul. 22, 2010; Geneva, Switzerland; 32 pages.
Extended European Search Report dated Feb. 21, 2013; 5 pages.

* cited by examiner

*Primary Examiner* — Hoang-Vu A Nguyen-Ba
(74) *Attorney, Agent, or Firm* — Ericsson Canada Inc.; Dilip C. Andrade

(57) ABSTRACT

Logical content is defined by start/end times into a VoD media offering. The calculation of byte-range markers corresponding to the start/end times is distributed among the STBs to first request the particular logical content. Upon receiving an initial request for a logical content offering, an IPTV AS returns a VoD media file URL, start/end times, and null values of byte-range markers corresponding to the start/end times. In response to the null values, the initially-requesting STB downloads the entire VoD media file from a Download Media Server, and calculates the byte-range markers by comparing the start/end times to timestamps in non-encrypted headers in the VoD media file. The non-null byte-range markers are transmitted back to the IPTV AS, which provides them to STBs subsequently requesting the same logical content. The subsequently-requesting STBs may download only the logical content by providing the non-null byte-range markers to the Download Media Server.

25 Claims, 5 Drawing Sheets

DISTRIBUTED METHOD OF INDEXING TIME AND FILE SIZE ALIGNMENT

FIELD OF THE INVENTION

The present invention relates generally to Video on Demand subscriber networks, and in particular to a system and method of distributed calculation of byte addresses for logical content delivery.

BACKGROUND

Internet Protocol TeleVision (IPTV) is a system through which television-type content and services are delivered using the Internet Protocol (IP) over packet-switched networks, such as the Internet and most modern wireless telecommunication networks. IPTV is distinguished from various applications that transfer video files across networks, by an ongoing standardization process and deployment in subscriber-based telecommunication networks featuring tightly managed network security and performance, allowing a high Quality of Service (QoS) and enhanced user experience. IPTV subscriptions typically require at least one cooperative network node, referred to herein as a Set-Top Box (STB), installed at the subscriber premises. IPTV services may be classified into three main types: live (i.e., real-time) broadcast television, time-shifted television (e.g., replays of previously broadcast television content), and Video on Demand (VoD). VoD offerings typically comprise movies, as opposed to television content.

VoD is generally offered as a streaming service, such as Real Time Streaming Protocol (RTSP), or as a download service, such as HTTP download. VoD streaming service is used in IPTV deployments where the available bandwidth over the last mile (i.e., in the access network) is greater than the bandwidth required by the stream. VoD download service has no specific bandwidth requirements; the media content downloads in the background and when completed, the user is notified that he or she may begin to play it.

Rental movies are the content typically offered through the VoD service, including VoD download service. In this case, the movie asset within the offering package references the entire VoD media file. A Download Manager application within the STB must either download the media file fully before starting to play it, or utilize a Progressive Download delivery method, whereby the play can start before the file is been fully downloaded.

Another type of content offered through the VoD service, including VoD download service, is called logical content. A logical content offering is one or more clips, or portions, of a movie or other VoD media file. As a practical implementation matter, it is not feasible to download an entire VoD media file to the STB and play only a portion of it, considering the impact on the bandwidth consumed and the download time. The bandwidth available for the VoD download service is generally limited; hence, such an implementation is not user friendly or cost effective.

There are three known solutions addressing the logical content download optimization problem: Content/Asset Management System (CMS/AMS); server-based logical content clipping; and client-based logical content clipping.

The CMS/AMS solution generates, at logical package creation time, a new VoD package for download, which contains the clipped media file. In this solution, each time a new logical content is defined, the base movie asset (i.e., a VoD media file) must be decrypted and clipped, and the logical content re-encrypted. The decryption/re-encryption process is resource intensive, and is therefore disfavored by operators.

In server-based logical content clipping, a logical content package, which contains start and end time markers for the base asset, is created. For example, the start/end time markers may comprise startNPT/endNPT (Normal Playback Time) markers, that measure elapsed time from a specific temporal point within the VoD media file (e.g., NPT=0 or the Beginning Of Stream, or BOS, marker). At package ingestion, the Download Media Server downloads the entire media file from a CMS/AMS. The STB retrieves the startNPT/endNPT markers from an IPTV Application Server (AS) at the time of purchasing the logical content offering. The STB then requests a time-range download from the download media server. However, most media servers support byte-range partial file download, as this is standard in the HTTP protocol (range header), but do not in fact support time-range downloads. The time-range download is not supported in standards published by standards bodies such as the Internet Engineering Task Force (IETF). Therefore, media server manufacturers do not have any incentive to implement this method.

In client-based logical content clipping, the STB obtains the temporal start/end markers from the IPTV AS upon purchasing the VoD offering. The STB then downloads the entire VoD media file from the download media server, but only plays (as specified in the purchased VoD offering) the time range delimited by the temporal markers. The obvious drawback of this solution is that the entire VoD media file must to be downloaded to the STB, but only a small portion is rendered to a user. This wastes bandwidth in any scenario, but in the particular case of low bandwidth in the last mile access network, would result in long download time. This is especially critical when the logical content is only a small segment of a long movie, as in the case of movie advertisement.

There exists a need in the art for an efficient system and method of delivering VoD logical content to a plurality of STBs, without wasting bandwidth and by utilizing industry-standard file fragmentation protocols.

SUMMARY

According to one or more embodiments disclosed and claimed herein, the calculation of byte-range markers corresponding to the temporal start and end markers into a VoD media file that define a logical content offering, is distributed among the STBs to first request the particular logical content. Upon receiving an initial request for a logical content offering, an IPTV AS returns a VoD media file URL, start and end times into the VoD media file defining the logical content offering, and null values of byte-range markers corresponding to the start and end times. In response to the null values, the initially-requesting STB downloads the entire VoD media file from a Download Media Server (using the URL). The initially-requesting STB then calculates the byte-range markers corresponding to the start and end times by inspecting timestamps in headers in the VoD media file. The headers are not encrypted, and the full VoD media file need not be decrypted for this calculation. The valid (non-null) byte-range markers are transmitted back to the IPTV AS, which provides them to STBs that subsequently request the same logical content. The subsequently-requesting STBs may download only the logical content by providing the valid byte-range markers (with the VoD media file URL) to the Download Media Server. The Download Media Server, which implements the HTTP Range header functionality, may extract, without decryption, the logical content, and transmit only that portion of the VoD media file to all subsequently-requesting STBs.

One embodiment relates to a method of distributing logical content in a VoD network. A first request for logical content comprising a subset of a VoD media file, and defined by predetermined start and end times measured from a temporal start point within the VoD media file, is received from a network node. A URL associated with the VoD media file, the start and end times defining the logical content, and byte-range markers defining offsets into the VoD media file corresponding to the start and end times, wherein the byte-range markers have a null value, are transmitted to the first requesting node. Non-null values for the byte-range markers are received from the first requesting node and stored. One or more subsequent requests for the same logical content are received from one or more network nodes. A URL associated with the VoD media file, the start and end times defining the logical content, and the non-null byte-range markers corresponding to the start and end times are transmitted to each subsequent requesting node.

Another embodiment relates to a method of receiving logical content by a STB in a VoD network. A request for logical content comprising a subset of a VoD media file, the subset defined by predetermined start and end times measured from a temporal start point within the VoD media file, is transmitted to an IPTV AS. A URL associated with the VoD media file, the start and end times defining the logical content, and byte-range markers defining offsets into the VoD media file corresponding to the start and end times, wherein the byte-range markers have a null value, are received from the IPTV AS. In response to the null byte-range markers, a request for the full VoD media file, and the URL associated with the VoD media file, are transmitted to a Download Media Server. The full VoD media file is received from the Download Media Server. Non-null values of the byte-range markers corresponding to the start and end times are ascertained, and the non-null byte-range markers are transmitted to the IPTV AS.

Yet another embodiment relates to an IPTV AS operative to deliver logical content in a VoD network. The IPTV AS includes a transceiver operative to transmit and receive data to and from a plurality of network nodes, and memory. The IPTV AS also includes a controller operative to control the transceiver to receive, from a network node, a first request for logical content comprising a subset of a VoD media file, the subset defined by predetermined start and end times measured from a temporal start point within the VoD media file. The controller is further operative to control the transceiver to transmit, to the first requesting node, a URL associated with the VoD media file, the start and end times defining the logical content, and byte-range markers defining offsets into the VoD media file corresponding to the start and end times, wherein the byte-range markers have a null value. The controller is further operative to control the transceiver to receive, from the first requesting node, non-null values for the byte-range markers. The controller is further operative to control the memory to store the non-null byte-range markers. The controller is further operative to control the transceiver to receive, from one or more network nodes, one or more subsequent requests for the same logical content; and to transmit, to each subsequent requesting node, a URL associated with the VoD media file, the start and end times defining the logical content, and the non-null byte-range markers corresponding to the start and end times.

Still another embodiment relates to a network node operative to receive logical content in a VoD network. The node includes a transceiver operative to transmit and receive data to and from at least one network node. The node also includes a controller operative to control the transceiver to transmit, to an IPTV AS, a request for logical content comprising a subset of a VoD media file, the subset defined by predetermined start and end times measured from a temporal start point within the VoD media file. The controller is further operative to control the transceiver to receive, from the IPTV AS, a URL associated with the VoD media file, the start and end times defining the logical content, and byte-range markers defining offsets into the VoD media file corresponding to the start and end times, wherein the byte-range markers have a null value. In response to the null byte-range markers, the controller is further operative to control the transceiver to transmit a request for the full VoD media file, and the URL associated with the VoD media file, to a Download Media Server, and to receive the VoD media file from the Download Media Server. The controller is further operative to ascertain non-null values of the byte-range markers corresponding to the start and end times, and to control the transceiver to transmit the non-null byte-range markers to the IPTV AS.

BRIEF DESCRIPTION OF THE DRAWINGS

FIG. 3 is a flow diagram of a method of delivering VoD logical content from an IPTV AS.

DETAILED DESCRIPTION

Figure 1:
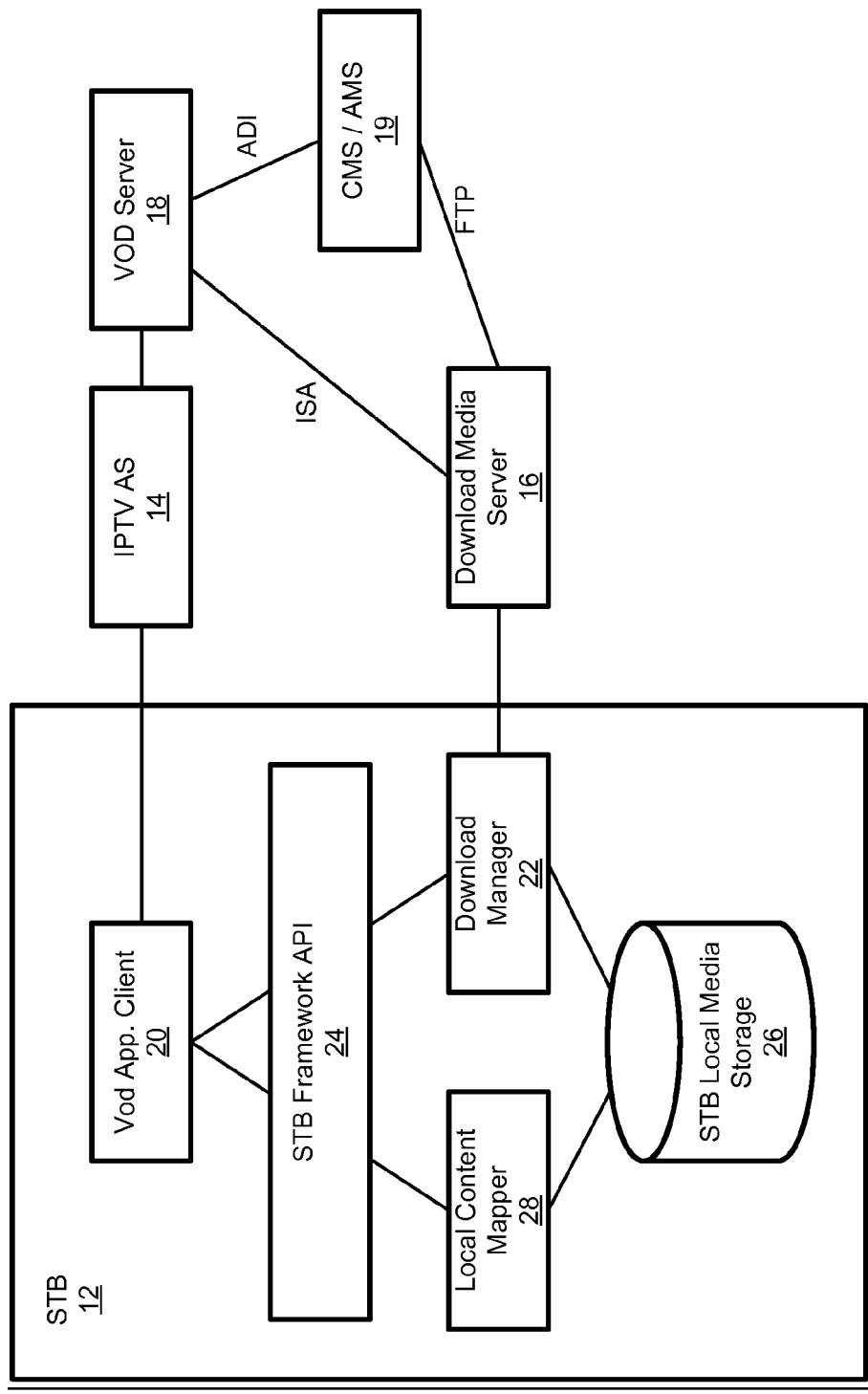
FIG. 1 is a functional block diagram of a VoD subscriber network.

FIG. 1 depicts a representative VoD subscription network 10. The network 10 includes a plurality of Set Top Boxes (STB) 12, and IPTV Application Server (IPTV AS) 14, a Download Media Server 18, a VoD server 18, and a CMS/AMS 19. An access network (not shown) may reside between the STB 12 and other network nodes 14, 16, 18, providing "last mile" connectivity.

The IPTV AS 14 manages the VoD system, including running the vending (or subscription) process, maintaining and providing catalogs of VoD content, accepting and approving requests for VoD media delivery to the STB 12, and delivering VoD download information to the STB 12. The Download Media Server 16 stores the VoD download media file and delivers full and partial VoD media files to STBs 12. The Download Media Server 16 is able to deliver portions of VoD media files to STBs 12 using byte-range markers, based on the HTTP Range header. The Download Media Server 16 downloads the VoD media files from the CMS/AMS 19, e.g., using File Transfer Protocol (FTP). The ingestion may be controlled by an application such as OpenStream, which forwards to the Download Media Server 16 the media file URL (pointing to AMS/CMS 19).

The STB 12, which may comprise a network node provided by the IPTV vender, a gaming console with STB functionality in software, or the like, is the user interface to the VoD subscription network 10. Users view content offerings, make selections, order VoD media, and view the delivered VoD media content, via the STB 12. To implement this functionality, the STB 12 includes STB Local Media Storage 26, such as a disc drive, and several applications or functional modules, including a VoD App Client 20, a Download Manager 22, and a Logical Content Mapper 28. The VoD App Client 20, which interfaces to other applications on the STB 12 via an STB Framework Application Programming Interface (API) 24, interfaces with the IPTV AS 14. The VoD App Client 20, under user control, displays catalogs of VoD content, and accepts user requests for VoD content and submits them to the IPTV AS 14. The IPTV AS 14 returns to the VoD App Client 20 a URL specifying the location of the VoD media file to be delivered. The VoD App Client 20 communicates this information to the Download Manager 22, which retrieves the VoD media file from the Download Media Server 16, using the URL received from the IPTV AS 14. The VoD media file, or portions thereof, is stored in the STB Local Media Storage 26, from which it is retrieved and rendered to the user, such as to a television screen and speakers (not shown), or other media player.

As discussed above, logical content is defined in offerings on the IPTV AS 14 by predetermined start and end times measured from a temporal start point within a VoD media file. However, most implementations of the Download Media Server 16 cannot extract logical content from VoD media files based on temporal start/end markers, and other methods of logical content extraction and delivery to the STB 12 are inefficient or impractical, due in part to the need to decrypt the VoD media file and re-encrypt the logical content.

According to embodiments of the present invention, a distributed logical content extraction and delivery system amortizes the wasteful bandwidth "hit" of a full VoD media file download to the first STB 12 that orders a particular logical content offering, over all subsequent deliveries of the same logical content. The first STB 12 downloads the full VoD media file, and calculates the byte-range markers into the file that corresponding to the temporal start/end markers that define the logical content offering (received from the IPTV AS 14 when ordering). The first STB 12 can do this without decrypting the entire VoD media file, as it compares the start/end markers to timestamps in unencrypted packet headers in the VoD media file. This first STB 12 then transmits the byte-range markers to the IPTV AS 14, which stores them and associates them with the logical content offering.

Subsequent STBs 12 that order the logical content receive from the IPTV AS 14, in addition to other information (the VoD media file URL, the temporal start/end markers defining the logical content, and the like), the byte-range markers into the VoD media file that define the logical content offering. These STBs 12 then request only the logical content from the Download Media Server 16. Since the Download Media Server 16 supports HTTP Range headers, it is able to easily extract the logical content from a VoD media file, and deliver only the logical content to the second and subsequent requesting STBs 12. Since it uses byte-range markers to extract part of the VoD media file, the Download Media Server 16 does not need to decrypt the VoD media file, or re-encrypt the extracted logical content. Hence, all orders for a given logical content offering, other than the first order, are delivered quickly and efficiently.

Figure 2:
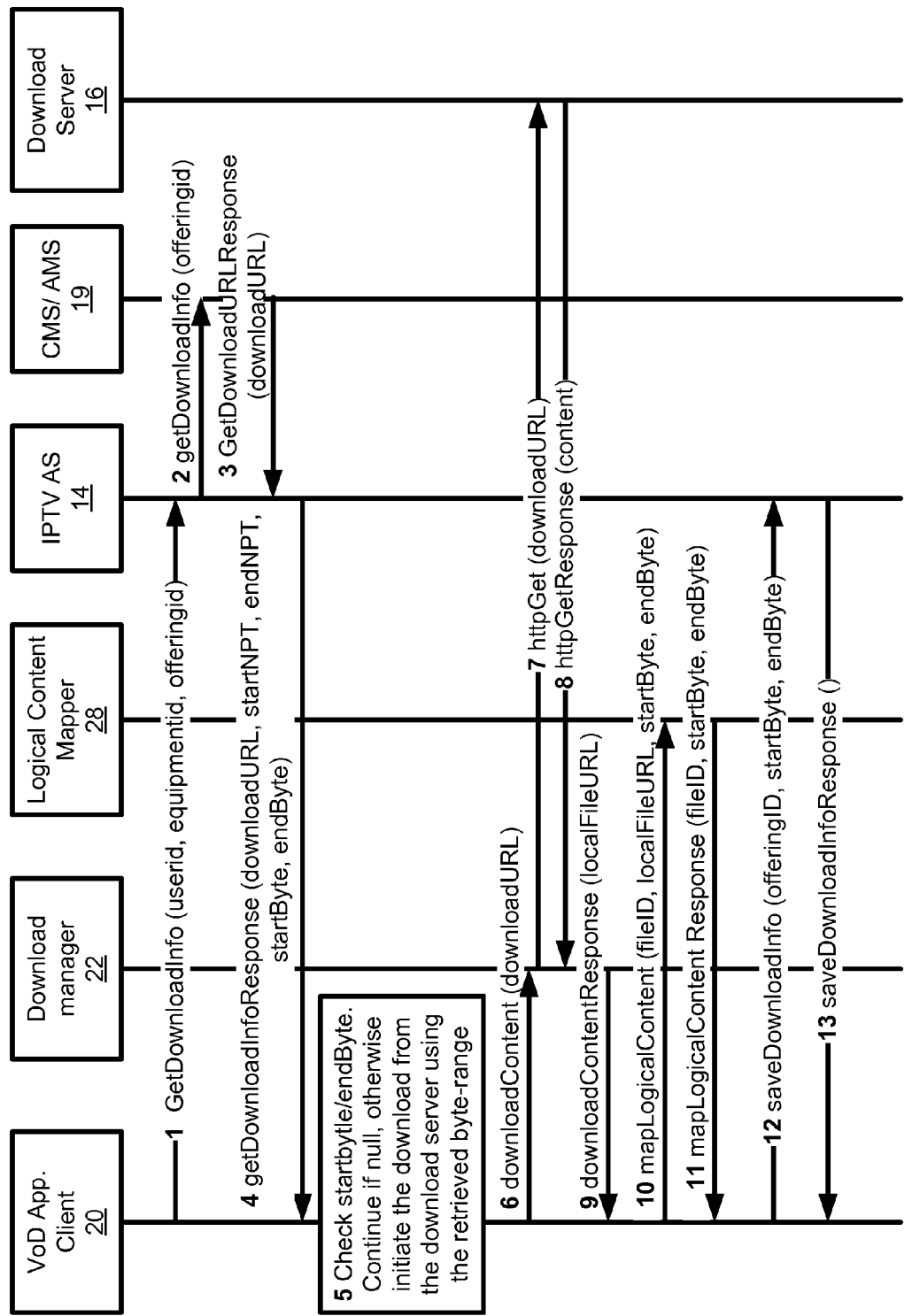
FIG. 2 is a signaling diagram depicting an initial VoD logical content request, and the generation and reporting of byte-range markers.

This process is described more fully with reference to the signal flow diagram of FIG. 2. Initially, a user purchases a VoD offering which contains logical content. The logical content (portion of a base VoD media file) is specified in the offering using a time-range expressed in the form startNPT/endNPT (Normal Playback Time). The STB 12 orders VoD content from an IPTV AS 14, and the media files are served to the STB 12 from a Download Media Server 16 (which retrieves them from a CMS/AMS 19).

In particular, the VoD App Client 20 retrieves from IPTV AS 14 the DownloadInfo by providing the userId, equipmentId and the offeringId of the offering purchased by the user (step 1). The IPTV AS 14 gets the corresponding VoD media file URL from the VoD server 18 (steps 2-3). The IPTV AS 14 returns to the STB 12 VoDDownloadInfo including the URL, start/end times defining the logical content, and byte-range markers into the VoD media file corresponding to the start/end times (step 4). If the logical offering exists in a sharing repository (i.e., if this is a subsequent request for the logical content offering), the byteStart/byteEnd markers are valid. Otherwise (i.e., if this is the first request for the logical content offering), these markers are null.

As used herein, a "null" value for a byte-range marker means either an attribute-value pair for which the value is a predetermined value indicating a null condition (e.g., zero, 'hFFFF, or some other predetermined value), or the lack of any attribute-value pair for the byte-range marker. In either case, the STB 12 may determine that valid byte-range marker values have not yet been determined for the requested logical content offering. Conversely, as used herein, a "valid" or "non-null" value for a byte-range marker means a byte count that defines an offset into a VoD media file. Thus, valid or non-null byte-range marker values are constrained to the range from zero to the VoD media file size.

The VoD App Client 20 checks the byteStart/byteEnd markers (step 5). If they are valid—that is, if they exist, and define byte count offsets into a VoD media file—it instructs the Download Manager 22 to retrieve the logical content offering from the Download Media Server 16 using the byte-range markers (not shown).

If the byteStart/byteEnd markers have a null value, the VoD App client 20 requests the Download Manager 22 to start downloading the VoD media file stored at the address provided in the downloadURL parameter (step 6). The Download Manager 22 retrieves the VoD media file from the Download Media Server 16 (steps 7-8), stores it in the STB Local Media Storage 26, and notifies the VoD App Client 20 by returning the URL of the local VoD media file (step 9).

The VoD App Client then calls the Logical Content Mapper 28 to calculate the byte-range markers (byteStart/byteEnd) (step 10). The request contains the ID of the VoD media file to be analyzed, the URL retrieved in step 9, and the time-range markers (startNPT/endNPT). The Logical Content Mapper 28 executes a byte-range search algorithm, described further herein, in which it matches the time-range start/end markers to header timestamps, and calculates byteStart/byteEnd markers corresponding to the startNPT/endNPT markers for the particular VoD media file. The Logical Content Mapper 28 returns the byteStart/byteEnd markers to the VoD App Client 20 (step 11).

The VoD App Client saves the byte-range markers specifying the logical content in the VoD media file to IPTV AS sharing repository (steps 12-13), for use by all subsequent STBs 12 that order the same logical content offering. The STB 12 then renders the logical content to the user, such as by outputting it to a television or other media player.

Figure 3:
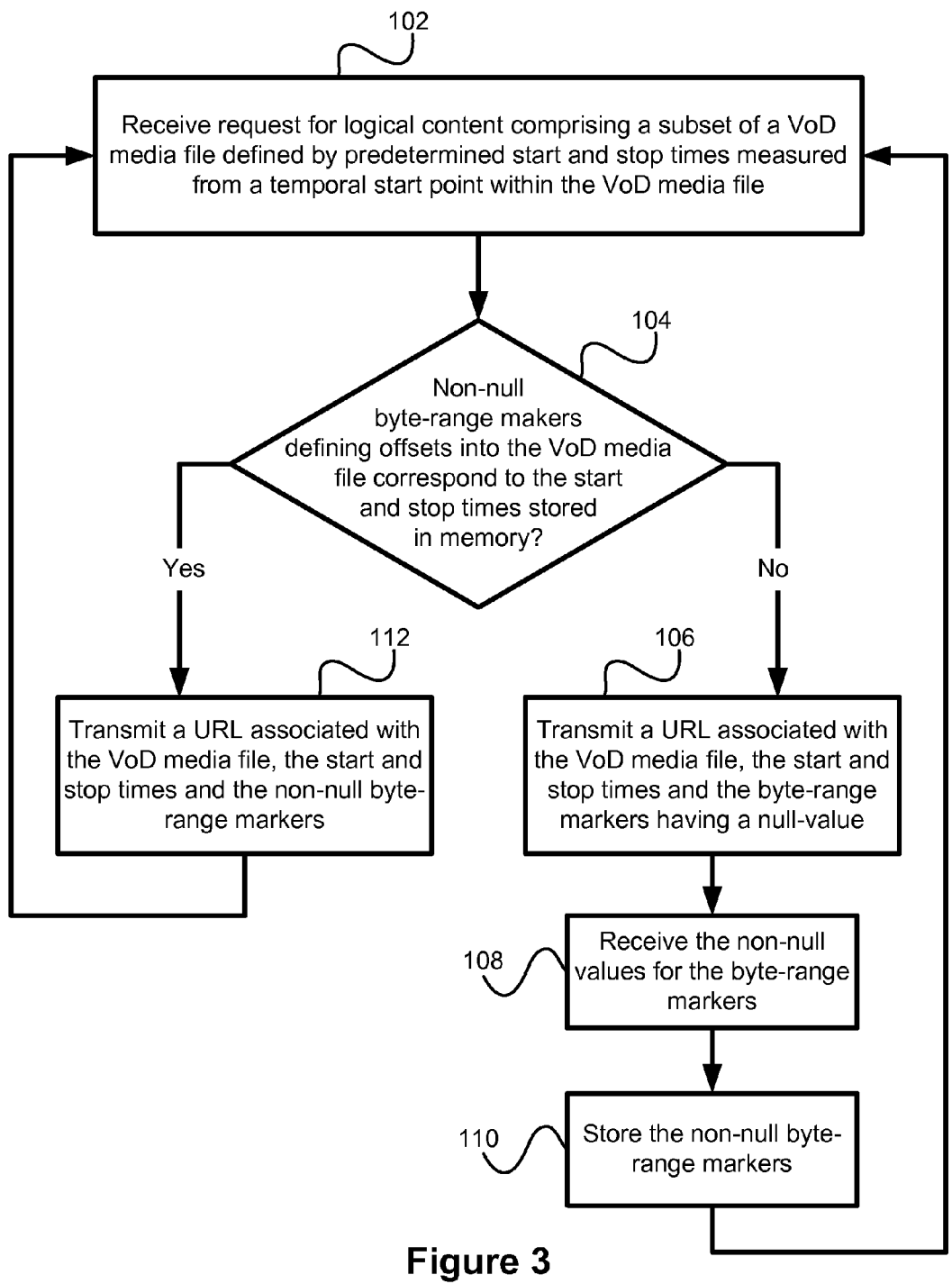

FIG. 3 depicts a process 100 executed by the IPTV AS 14 to implement the inventive distributed logical content download. The IPTV AS 14 receives, from an STB 12, a request for logical content (block 102). The logical content is a subset of a VoD media file defined by start/end markers measured form a temporal start point in the VoD media file. The IPTV AS 14 retrieves a URL associated with the VoD media file from which the logical content is extracted (not shown), and retrieves byte-range markers corresponding to the start/end markers. If the byte-range markers have a valid, non-null value (block 104), then the IPTV AS 14 transmits the URL, the start/end markers, and the non-null byte range markers to the requesting STB 12 (block 112).

However, if the byte-range markers have a null value (block 104), then this is the first request for the logical content, and valid byte-range markers have yet to be calculated. In this case, the IPTV AS 14 transmits the VoD media file URL, the start/end times, and the null byte-range markers to the STB 12 (block 106). After the STB 12 retrieves the full VoD media file and calculates valid byte-range marker values corresponding to the start/end markers, the IPTV AS 14 receives the valid byte-range markers from the STB 12 (block 108), and stores them in a shared repository (block 110).

Figure 4:
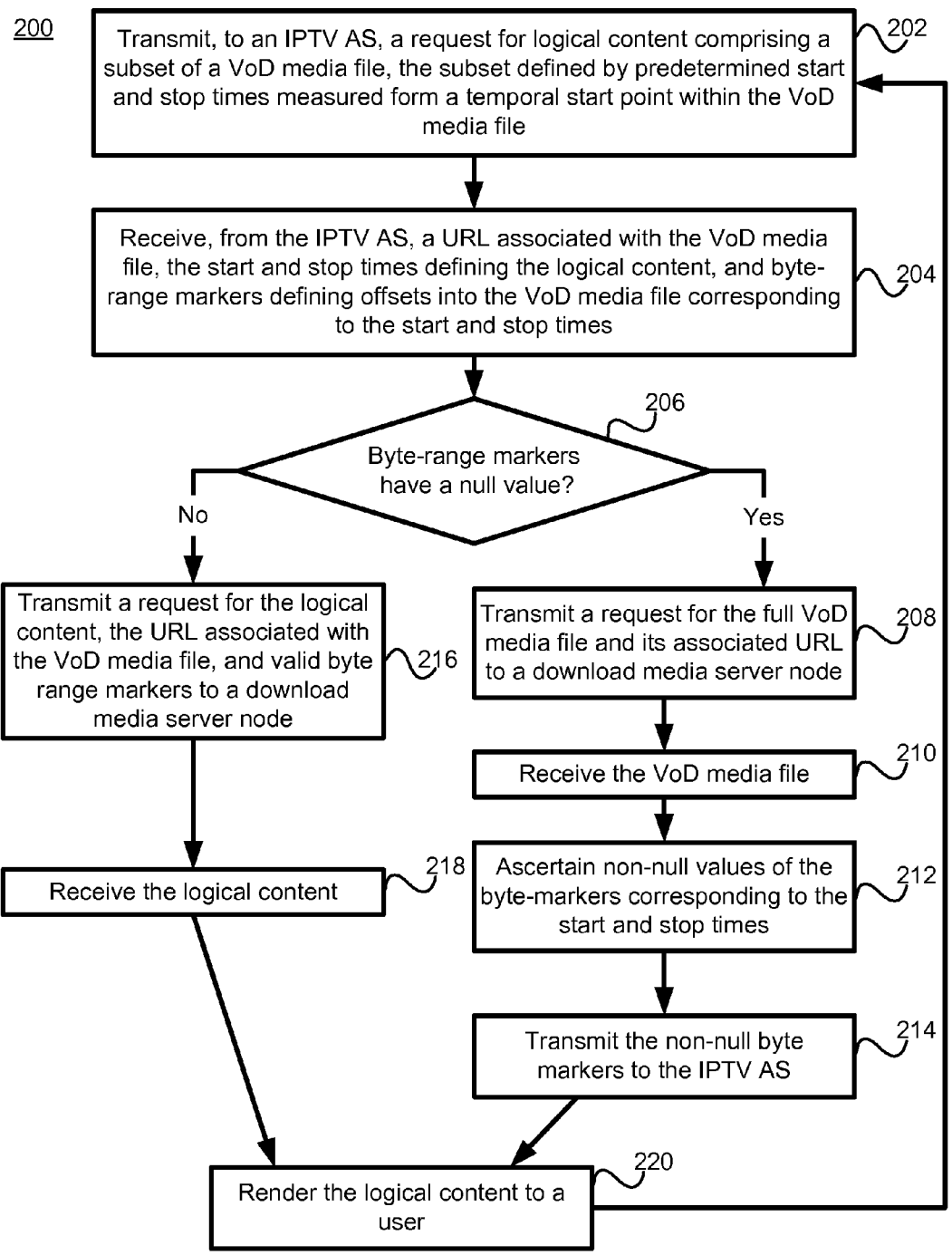
FIG. 4 is a flow diagram of a method of receiving VoD logical content at a STB.

FIG. 4 depicts a process 200 executed by a STB 12 to implement the inventive distributed logical content download. The STB 12 transmits, to an IPTV AS 14, a request for logical content (block 202). The logical content is a subset of a VoD media file defined by start/end markers measured form a temporal start point in the VoD media file. The STB 12 receives from the IPTV AS 14 a URL associated with the VoD media file from which the logical content is extracted, the start/end markers that define the logical content, and byte-range markers corresponding to the start/end markers (204).

If the byte-range markers have a null value (block 206), then the STB 12 transmits the URL and a request for the full VoD media file to a Download Media Server 16 (block 208). The STB 12 receives (and stores) the full VoD media file (block 210). The STB analyzes the VoD media file, and ascertains valid, non-null values for the byte-range markers, which correspond to the start/end markers defining the logical content offering (block 212). The STB 12 transmits the non-null byte-range markers to the IPTV AS 14, for use by subsequent STBs 12 requesting the same logical content offering (block 214).

If the byte-range markers received from the IPTV AS 14 have a valid, non-null value (block 206), then the STB 12 transmits a request for the logical content, the VoD media file URL, and the valid byte-range markers to a Download Media Server 16 (block 216), and receives the logical content in response (block 218).

Once the STB 12 has the logical content extracted—whether extracted from the full VoD media file using the byte-range markers the STB 12 ascertained (block 212), or received from the Download Media Server 16 (block 218) in response to valid byte-range markers it received from the IPTV AS 14 (block 204)—the STB 12 renders the logical content to a user (block 220), such as by outputting it to a television or other media player.

Figure 5:
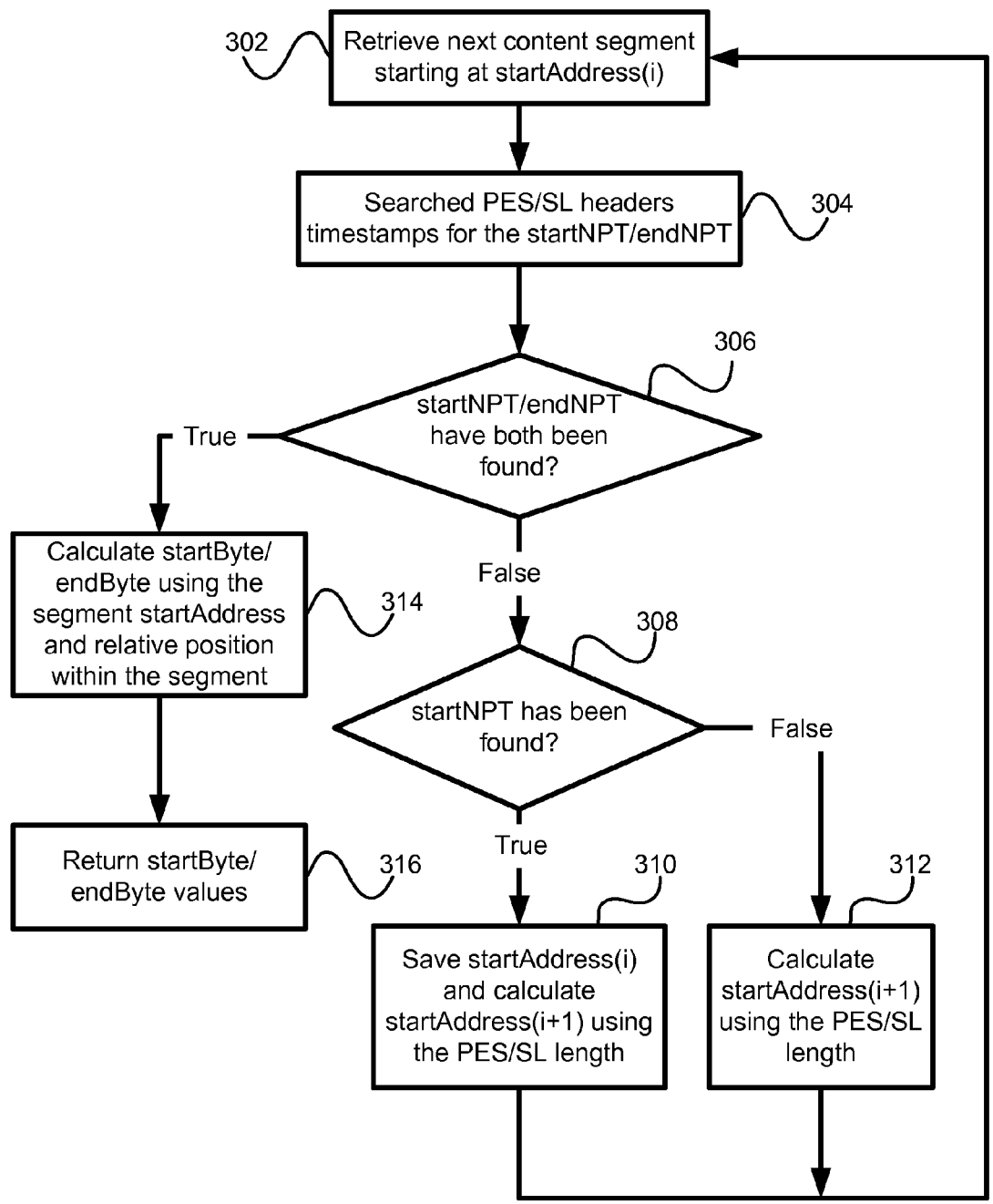
FIG. 5 is a flow diagram of a method of calculating byte-range markers for VoD logical content at an initially-requesting STV.

FIG. 5 depicts a process 300 executed by a Logical Content Mapper 28 in an STB 12 to implement the inventive distributed logical content download.

Initially read, in direct file access mode, a segment of the full VoD media file (stored in the STB Local Media Storage 26) addressed by the localFileURL obtained from the VoD App Client 20 (blocks 302). Set the segment size to be a multiple of the maximum size of the Packetized Elementary Stream (PES) for MPEG-2 packet, or Synchronization Layer (SL) for MPEG-4 packet.

Search the headers of the PES/SL packets for timestamps equal to the startNPT/endNPT markers (blocks 304). The Presentation Time Stamp (PTS) is used if it is provided in the header; otherwise, either the Decoding Time Stamp (DTS) or Composition Time Stamp (CTS) is used.

If startNPT is not found the current segment (blocks 306, 308), calculate the next segment startAddress using the packet size retrieved from the PES/SL packet header (block 312), retrieve a new segment (block 302), and repeat the method.

If startNPT has been found (blocks 306, 308), save the startAddress and the PES/SL relative address within the buffer, and calculates the next segment startAddress using the packet size retrieved from the PES/SL packet header (block 310), and repeat the method.

Once the endNPT marker is found (block 306), calculate the byte-range of the logical content, i.e., the byteStart/byteEnd, using the segmentAddress of the segments where the time-range markers have been found, and the PES/SL relative address within that specific segment (block 314). Then return the byteStart/byteEnd marker values to the VoD App Client 20 (block 316).

For simplicity and clarity of explication, the present invention has been described herein with respect to a logical content offering comprising a single, contiguous segment of a VoD media file. In reality, logical content (e.g., movie "trailers" or advertisements) often comprise a plurality of disjoint or non-contiguous segments extracted from a VoD media file. In this case, the IPTV AS 14 will provide a corresponding number of start/end marker pairs to the VoD App Client 20, and the Logical Content Mapper 28 must run the method 300 of FIG. 5 multiple times (with appropriate modifications to account for multiple sets of segment addresses and offsets, as will be readily apparent to those of skill in the art). In this case, the Logical Content Mapper 28 will return multiple pairs of non-null byte marker values to the VoD App Client 20, which will in turn transmit multiple non-null byte marker values to the IPTV AS 14 for storage in the shared repository. All segments comprising the logical content must be concatenated into one single file in the STB Local Media Storage 26 before passing control to a media player. Of course, in the corresponding case of receiving multiple valid (non-null) byte-range markers from the IPTV AS 14, the Download Manager 22 must download all segments for the logical content from the Download Media Server 16, and concatenate them in the STB Local Media Storage 26, prior to passing control to a media player.

The method depicted in FIG. 5 refers to calculation of the byte-range markers corresponding to a logical content which consists of one single stream (e.g., video stream), and which includes no control information. The method does not specify any particular procedure regarding how to handle the transmission headers in the media file, or the packets containing control information. This information must be included into the logical content media file as it is required by the client to interpret the content of PES/SL packets. The Logical Content Mapper 28 must therefore return a set of byteStart/byteEnd markers delimiting the following:

Transmission headers in the media file;

PES/SLs corresponding to logical content within the elementary video streams (if there are multiple streams);

PES/SLs corresponding to logical content within the elementary audio streams (if there are multiple streams). Depending on the multiplexing method, the elementary audio packets may be tightly coupled to their time-corresponding elementary video packet, and hence should be included in one single byte-range set; and Control information (e.g., the Conditional Access Table).

Those of skill in the art may readily determine appropriate methods to account for this information in particular applications, without undue experimentation, given the teachings of the present disclosure.

Embodiments of the present invention provide a scalable, client-based architecture for the generation of byte-range markers corresponding to the start/end markers defining logical content offerings, with no performance impact on the network nodes. The solution does not require the decryption of the media file or decoding of MPEG PES/SL packets. Only the packet headers are analyzed.

VoD download service has a significant business potential in countries which do not have a mature broadband infrastructure, and hence a VoD service based on streaming transport (e.g., RTSP) is not feasible. This opportunity becomes even more acute with the introduction of HD television. Use of HTTP download as transport protocol makes it possible for operators in these markets to capitalize on premium content without waiting for investments in the broadband infrastructure aiming to increase the last mile bandwidth. In these markets, the bandwidth lost by downloading an entire VoD media file, instead of just a portion of it, would be in contrast with the limited speed/bandwidth available; therefore logical content would be avoided for purchase. That is, without implementation of a mechanism allowing the download of only the segment of the media file corresponding to the logical content purchased, only full movies would be purchased by user in these markets. It should be noted that logical content is an essential element in the construction of media playlists, which typically contain, besides the purchased content, advertisements of feature presentations (i.e., clips of a full length movie).

Implementation of VoD media file clipping to support logical content in the Download Media Server 16 is not cost effective, as the Download Media Server 16 would need to be over-dimensioned to allow searches through VoD media files. Embodiments of the present invention provide a cost-effective solution based on client-based distributed search, and sharing of the search results among the STBs 12 in the network 10.

Those of skill in the art will recognize that the VoD App Client 20, Download Manager 22, and Logical Content Mapper 28 may be implemented in hardware, as programmable logic with appropriate firmware, as software modules executed on a processor or Digital Signal Processor (DSP), or any combination thereof. Furthermore, the division of tasks between the modules 20, 22, and 28 is representative only, and is not limiting. For example, although the actual VoD media file header search and byte-range marker determination is described herein and being performed by an inventive module referred to as the Logical Content Mapper 28, those of skill in the art will appreciate that the functionality is not confined to such an implementation, and may be performed in the Download Manager 22, VoD App Client 20, or other functional module or unit.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of distributing logical content in a Video on Demand (VoD) network, comprising:
    receiving, from a network node, a first request for logical content comprising a subset of a VoD media file, the subset defined by predetermined start and end times measured from a temporal start point within the VoD media file at least one of the start time and end time being different from the beginning and end of the VoD media file;
    transmitting, to the requesting node, a URL associated with the VoD media file, the start and end times defining the logical content, and byte-range markers defining offsets into the VoD media file corresponding to the start and end times, wherein the byte-range markers have a null value;
    receiving, from the first requesting node, non-null values for the byte-range markers;
    storing the non-null byte-range markers;
    receiving, from one or more network nodes, one or more subsequent requests for the same logical content; and
    transmitting, to each subsequent requesting node, a URL associated with the VoD media file, the start and end times defining the logical content, and the non-null byte-range markers corresponding to the start and end times.

2. The method of claim 1 wherein the URL associated with the VoD media file is operative to direct a Download Media Server to a Content/Asset Management System to retrieve the VoD media file.

3. The method of claim 2 wherein the non-null byte-range markers associated with the logical content are operative to cause the Download Media Server to serve only a portion of the VoD media file defined by the non-null byte-range markers.

4. A method of receiving logical content by a Set Top Box (STB) in a Video on Demand (VoD) network, comprising:
    transmitting, to an Internet Protocol Television (IPTV) Application Server (AS), a request for logical content comprising a subset of a VoD media file, the subset defined by predetermined start and end times measured from a temporal start point within the VoD media file and at least one of the start time and end time being different from the beginning and end of the VoD media file;
    receiving, from the IPTV AS, a URL associated with the VoD media file, the start and end times defining the logical content, and byte-range markers defining offsets into the VoD media file corresponding to the start and end times, wherein the byte-range markers have a null value;
    in response to the null byte-range markers, transmitting a request for a full VoD media file, and the URL associated with the VoD media file, to a Download Media Server;
    receiving the full VoD media file from the Download Media Server;
    ascertaining non-null values of the byte-range markers corresponding to the start and end times; and
    transmitting the non-null byte-range markers to the IPTV AS.

5. The method of claim 4 wherein ascertaining non-null values of the byte-markers corresponding to the start and end times comprises:
    comparing the start and end times to timestamps in packet headers in the VoD media file; and
    calculating the byte-marker values as offsets into the VoD media file at the locations of matching timestamps.

6. The method of claim 5 further comprising searching the VoD media file in successive segments, and wherein calculating each byte-marker value comprises calculating an offset into a segment at the location of a matching timestamp, and adding to the offset the product of a number of prior segments and a segment size.

7. The method of claim 6 wherein the segment size is a multiple of the maximum size of a Packetized Elementary Stream where the VoD media file contains MPEG-2 encoded content.

8. The method of claim 6 wherein the segment size is a multiple of the maximum size of a Synchronization Layer where the VoD media file contains MPEG-2 encoded content.

9. The method of claim 5 wherein the timestamps are Presentation Time Stamp values.

10. The method of claim 5 wherein the timestamps are Decoding Time Stamp values.

11. The method of claim 5 wherein the timestamps are Composition Time Stamp values.

12. The method of claim 4 further comprising receiving, from the IPTV AS, a plurality of start/end times, each defining a different portion of logical content extracted from the VoD media file, and further comprising ascertaining non-null values of byte-range markers corresponding to each pair of start and end times.

13. An Internet Protocol Television (IPTV) Application Server (AS) operative to deliver logical content in a Video on Demand (VoD) network, comprising:
 a transceiver operative to transmit and receive data to and from a plurality of network nodes;
 memory; and
 a controller operative to control the transceiver to
  receive, from a network node, a first request for logical content comprising a subset of a VoD media file, the subset defined by predetermined start and end times measured from a temporal start point within the VoD media file, at least one of the start time and end time being different from the beginning and end of the VoD media file;
  transmit, to the requesting node, a URL associated with the VoD media file, the start and end times defining the logical content, and byte-range markers defining offsets into the VoD media file corresponding to the start and end times, wherein the byte-range markers have a null value; and
  receive, from the first requesting node, non-null values for the byte-range markers;
 wherein the controller is further operative to control the memory to store the non-null byte-range markers; and
 wherein the controller is further operative to control the transceiver to
  receive, from one or more network nodes, one or more subsequent requests for the same logical content; and
  transmit, to each subsequent requesting node, a URL associated with the VoD media file, the start and end times defining the logical content, and the non-null byte-range markers corresponding to the start and end times.

14. A network node operative to receive logical content in a Video on Demand (VoD) network, comprising:
 a transceiver operative to transmit and receive data to and from a plurality of network nodes; and
 a controller operative to control the transceiver to
  transmit, to an Internet Protocol Television (IPTV) Application Server (AS), a request for logical content comprising a subset of a VoD media file, the subset defined by predetermined start and end times measured from a temporal start point within the VoD media file, at least one of the start time and end time being different from the beginning and end of the VoD media file;
  receive, from the IPTV AS, a URL associated with the VoD media file, the start and end times defining the logical content, and byte-range markers defining offsets into the VoD media file corresponding to the start and end times, wherein the byte-range markers have a null value;
  in response to the null byte-range markers, transmit a request for a full VoD media file, and the URL associated with the VoD media file, to a Download Media Server;
  receive the VoD media file from the Download Media Server;
 wherein the controller is further operative to ascertain non-null values of the byte-range markers corresponding to the start and end times; and
 wherein the controller is further operative to control the transceiver to transmit the non-null byte-range markers to the IPTV AS.

15. The node of claim 14 further comprising memory operative to store and selectively access the VoD media file.

16. The node of claim 15 wherein the controller is operative to implement a Download Manager operative to
 transmit the request for the full VoD media file, and the URL associated with the VoD media file, to the Download Media Server;
 receive the VoD media file from the Download Media Server; and
 store the VoD media file.

17. The node of claim 14 wherein the controller is operative to implement a VoD Application Client operative to
 transmit the logical content request to the IPTV AS;
 receive the URL associated with the VoD media file, start and end times, and null byte-range markers from the IPTV AS; and
 transmit the non-null byte-range markers to the IPTV AS.

18. The node of claim 17 wherein the VoD Application Client is further operative to
 send the URL associated with the VoD media file to a Download Manager operative to retrieve the VoD media file from a Download Media Server; and
 send the start and end times to a Logical Content Mapper operative to ascertain non-null values of the byte-range markers corresponding to the start and end times.

19. The node of claim 14 wherein the controller is operative to implement a Logical Content Mapper operative to ascertain non-null values of the byte-range markers corresponding to the start and end times.

20. The node of claim 19 wherein the Logical Content Mapper is operative to
 receive the start and end times from a VoD Application Client implemented on the controller, and
 selectively access the VoD media file from memory.

21. The node of claim 20 wherein the Logical Content Mapper is operative to ascertain non-null values of the byte-markers corresponding to the start and end times by
 comparing the start and end time to timestamps in packet headers in the VoD media file; and
 calculating the byte-range marker values as offsets into the VoD media file at the locations of matching timestamps.

22. The node of claim 21 wherein the Logical Content Mapper is further operative to ascertain non-null values of the byte-range markers by searching the VoD media file in successive segments, and wherein calculating each byte-range marker value comprises calculating an offset into a segment at the location of a matching timestamp, and adding to the offset the product of a number of prior segments and a segment size.

23. The node of claim 22 wherein the segment size is a multiple of the maximum size of a Packetized Elementary Stream where the VoD media file contains MPEG-2 encoded content.

24. The node of claim 22 wherein the segment size is a multiple of the maximum size of a Synchronization Layer where the VoD media file contains MPEG-2 encoded content.

25. The node of claim 21 wherein the timestamps are selected from a list comprising Presentation Time Stamp values, Decoding Time Stamp values and Composition Time Stamp values.

\* \* \* \* \*